Dec. 8, 1942.     F. L. G. KOLLMORGEN     2,304,414
LOCKING DEVICE
Filed Oct. 11, 1940     2 Sheets-Sheet 2
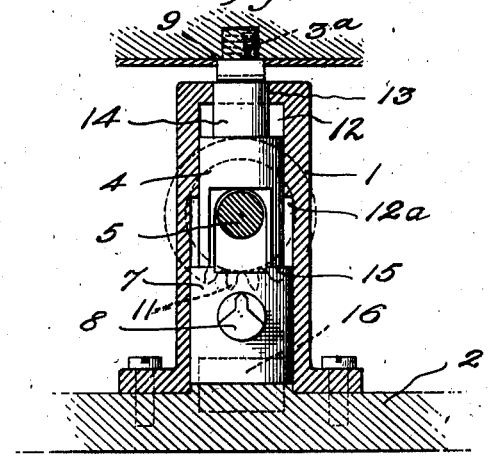
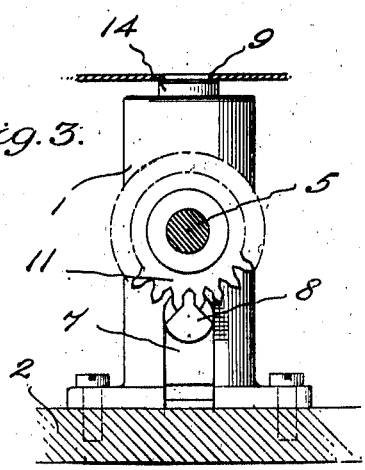
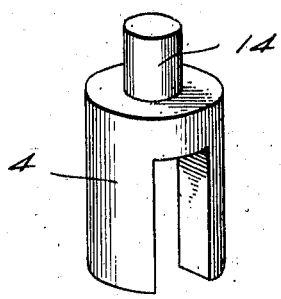
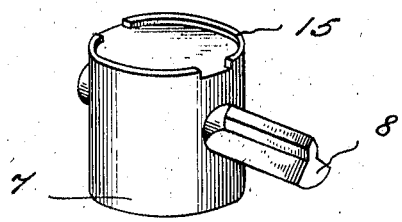
INVENTOR.
FREDERICK L. G. KOLLMORGEN
BY
ATTORNEY Patented Dec. 8, 1942

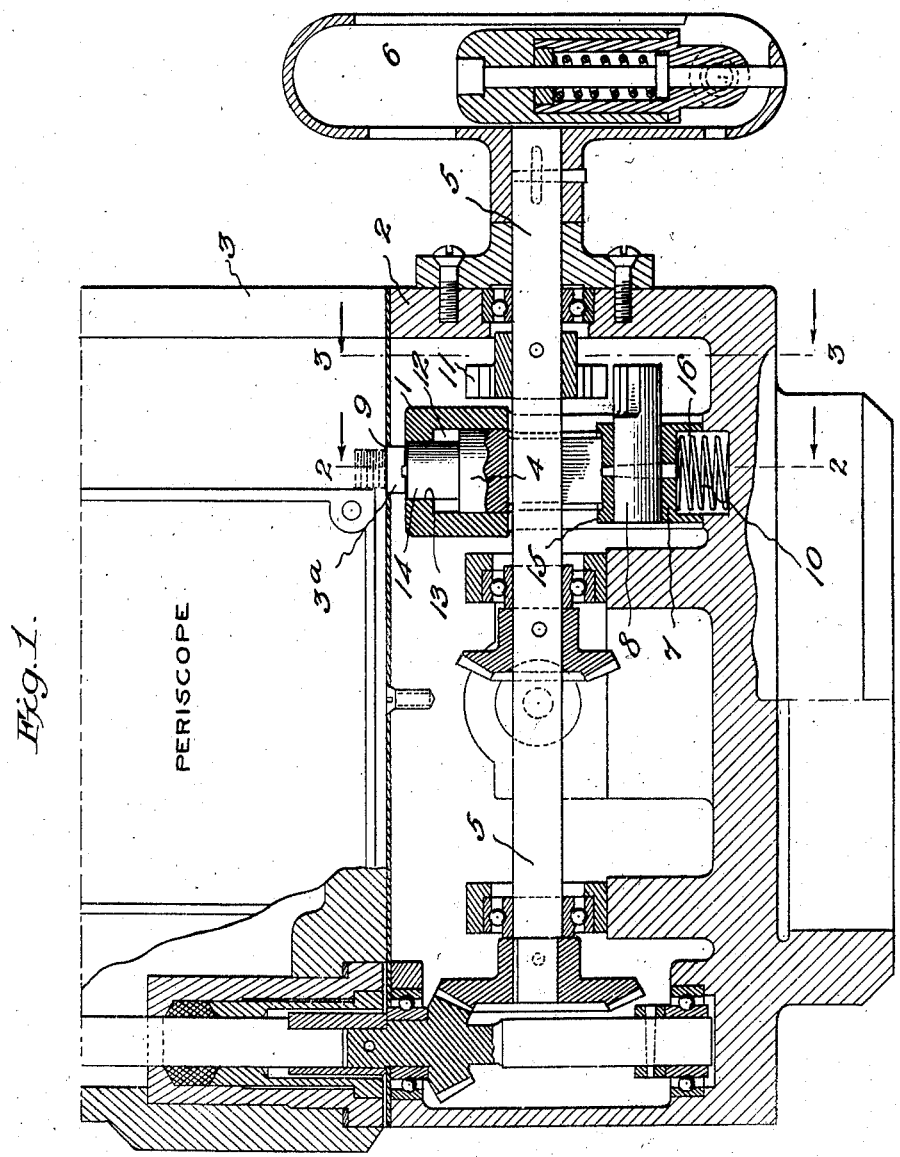

2,304,414

UNITED STATES PATENT OFFICE 2,304,414

LOCKING DEVICE

Frederick L. G. Kollmorgen, Onancock, Va., assignor to Kollmorgen Optical Corporation, Brooklyn, N. Y., a corporation of New York Application October 11, 1940, Serial No. 360,696

4 Claims. (Cl. 188—69)

The present invention relates to a locking device and, more particularly, to a locking device for use upon optical instruments and especially for use upon a combination periscope and stadimeter.

Many optical instruments of large size are constructed with a view to their being demountable for installation, cleaning, packing and other purposes. This is especially true where, besides the optical system, various calculating or measuring systems, dials, meters and gauges are incorporated in the instrument. When optical instruments of this type are demounted, so that the optical system is separated from the measuring dials and meters, great care must be exercised to insure that neither is moved or turned in its housing; otherwise, upon reassembling the instrument, the several parts will not be coordinated, and false and misleading readings will be obtained.

Thus, in a combination periscope and stadimeter such as is described in my United States Patent No. 1,986,731, issued January 1, 1935, the housing for the stadimeter dial or range meter and control shaft must be removed from the bottom of the periscope tubing for the purpose of installing the periscope in a submarine or of repairing or renovating it. When this housing is removed, movement of the dial obviously cannot be accompanied by control of the optical system, so that any such movement while the housing is disconnected from the periscope tube would throw the dial readings off by an equivalent amount.

It is an object of the present invention to provide a locking device for preventing movement of a part of an optical instrument while such instrument is disassembled.

It is another object of my invention to provide a locking device for optical instruments adapted to fix the position of the calculating or measuring systems, dials, meters, gauges, etc., when demounted from the optical system.

It is also an object of this invention to incorporate in optical instruments means for fixing the position of dials and cooperating control shafts while not operably connected to the optical system.

The present invention also contemplates the provision of an automatic locking device in optical instruments for promptly and positively fixing the position of dials and control shafts in their housing immediately upon detaching said housing from the housing of the optical system whereby a fool-proof locking device which entirely eliminates the human factor and prevents movement of said dials and control shafts is provided.

My invention has in contemplation the provision of an automatic and positive locking device in a combination periscope and stadimeter to prevent movement of dials and control shaft in their housing when said housing is demounted from the periscope tube whereby rotatable parts in said housing are instantly locked in fixed, non-rotatable position by a locking device which functions automatically upon removal of said housing from said tube.

Furthermore, my invention provides a novel locking device for my combination periscope and stadimeter adapted for automatically locking rotatable parts in the housing below the periscope tube as soon as said housing is demounted from said tube, thereby providing a fool-proof locking device which effectively prevents movement of rotatable parts in said housing during disassembly of said combination periscope and stadimeter whereby the accuracy and reliability of the instrument upon reassembly are assured without having to rely upon the care and discretion of the operator.

Other objects and advantages of my invention will be apparent from the following description, taken in conjunction with the accompanying drawings, in which:

Fig. 1 depicts a side elevation of the lower part of the periscope tube and of the housing therebelow in my combination periscope and stadimeter, partly cut away to show the position of my novel locking device relative thereto;

Fig. 2 is a front elevational view of my locking device with the casing in section, substantially along line 2—2 of Fig. 1, showing the relation of the parts when the device is in an inoperative position;

Fig. 3 illustrates a front elevation of the device in operative position after disassembly of the instrument, taken on line 3—3 of Fig. 1; and Figs. 4 and 5 show perspective views of elements of my novel locking device.

Generally speaking, my invention relates to a locking device inside the stadimeter housing below the periscope tube of my combination periscope and stadimeter. This device comprises a casing having a sliding plunger therein, and the casing and plunger are slotted to receive the control shaft from the range meter of the stadimeter. The slot in the plunger is sufficiently high so that its movement within the casing is not impeded by the control shaft. The plunger is upwardly urged through an orifice in the casing and is restrained from further upward movement preferably by a special screw or other protuberance on the bottom of the periscope tube passing through a port in the top of the gear housing. A projection keyed to the plunger at a point below the slot therein extends through the slot in the casing, and this projection has a tooth or knife-edge. A gear or cogwheel adapted to receive the tooth or knife-edge of said projection is keyed to the control shaft at a point above the projection. In this position, my locking device is inoperative, and the control shaft can be freely turned. When the gear housing is demounted from the periscope tube, the plunger is further upwardly urged as the restraint imposed by the bottom of the periscope tube or screw attached thereto is no longer present. This further movement of the plunger carries the knife edge of the projection thereon into the teeth of the cogwheel, effectively preventing rotational movement of said cogwheel and, consequently, of the control shaft to which it is keyed.

For the purpose of giving those skilled in the art a better understanding of my invention, a description of a preferred embodiment thereof will now be given.

Referring to Fig. 1, the casing 1 of my novel locking device is attached to the inside of a gear housing 2 below a periscope tube 3. Within the casing, which has a vertical bore extending through its top, there is a plunger 4 adapted for vertical movement in the bore. This plunger and the casing are slotted to receive a control shaft 5 from a stadimeter dial or actuating hand wheel 6 outside the housing, and said control shaft thus passes through my locking device. The slot is sufficiently high so that movement of the plunger 4 is not impeded by the shaft. A slide 7 is located in the casing bore just below plunger 4, and a projection or key 8 having a tooth or knife-edge or the like extends therefrom through the slot in the casing. Plunger 4 and slide 7 are in vertical contact, and the top of plunger 4 extends through the top of the casing beneath a port 9 in the top of housing 2. Slide 7 is upwardly urged, as by a spring 10 or other means, and so exercises inward pressure on plunger 4. The plunger is restrained by impinging against a special screw 3a fixedly attached to the bottom of periscope tube 3 and with its head protruding through port 9 into the stadimeter housing 2.

A gear or cogwheel 11 is keyed to control shaft 5 at a point thereon above the tooth or knife-edge of projection 8 and has teeth thereon adapted to receive the tooth or knife-edge of the projection. When the gear housing is mounted upon the periscope tube, the gear or cogwheel 11 is out of contact with said knife-edge, so that the control shaft is free to turn.

Details of the construction of my locking device will be more apparent from a study of Figs. 2 and 3. Reference character 1 therein indicates a substantially cylindrically casing of cast bronze or other metal or alloy which provides a sturdy construction. The casing is adapted to be bolted or otherwise attached to the floor of gear housing 2. It is provided with a bore 12 extending through its top, and the bore is preferably enlarged in diameter at its lower portion to form a space 12a and is preferably reduced at its top portion to form an orifice 13. The casing is slotted, front and back, at the lower portion of the bore.

A bifurcated cylindrical plunger 4 (see Fig. 4) with outside diameter sufficiently small to be accommodated by the casing bore 12 is provided, and the slot formed at the forked end of said cylindrical plunger is preferably only slightly larger than the diameter of the control shaft 5. Where a casing bore of reduced diameter at the top is provided, the plunger 4 is also reduced to a small cylinder 14 at the top, so that orifice 13 will accommodate the same. This bifurcated plunger is made long enough to extend through the orifice 13 and to a position beneath and adjacent to a port 9 in the top of the housing.

A cylindrical slide 7 is contained in the enlarged space 12a of casing bore 12, and this slide is preferably provided with a raised slotted shoulder 15 at the top thereof for the purpose of affording better contact with the forked end of plunger 4. A projection or key 8 is fastened in slide 7 and extends therefrom through the slot in the casing. The key 8 is adapted for sliding contact with the sides of the slot to prevent rotation of the key therein, and it has a knife-edge tooth adapted for meshing with teeth of similar design on a cogwheel. A recess 16 in the bottom of slide 7 is adapted to accommodate a spring 10 which is held under compression.

As has been described more generally supra, a gear or cogwheel 11 is keyed to the control shaft at a point above the knife-edge tooth of projection 8, and the relative location of the parts when the device is in operative position can be seen in Fig. 3. As shown here, the gear housing has been demounted from the periscope tube, and the spring has thrust slide 7 and plunger 4 in an upward direction, cylinder 14 at the top of plunger 4 being pushed through orifice 13 of the casing. This upward movement has brought projection 8 into contact with gear 11, and the tooth of the projection has meshed with the teeth of the gear, instantly and positively locking the same.

The operation of my device is thus apparent from a description of the figures. While the gear housing is mounted at the bottom of the periscope tube, the slide 7 is being urged upward by the spring 10 but is restrained from upward movement by contact with the plunger 4, which is in turn held down by the screw 3a on the bottom of the periscope tube. In this position, projection 8 is held out of contact with cogwheel 11, and the control shaft is free to move in its housing. When the gear housing is demounted from the periscope tube, there is no longer any restraint upon the plunger 4, so that the restraint on slide 7 is also removed. The spring 10 forces slide 7 upwardly, pushing cylinder 14 at the top of plunger 4 toward the port 9 and raising the projection 8 until it is in contact with gear or cogwheel 11. The tooth on the projection meshes with the teeth on the gear, instantly and positively locking the same. Since the gear is keyed to the control shaft, all rotational motion of the control shaft is prevented.

It will be observed that my novel locking device has the advantage of providing an effective and fool-proof means for preventing movement of rotatable parts in the gear housing during disassembly of my combination periscope and stadimeter. Thus, the accuracy and reliability of the instrument upon its reassembly has been secured, as the human factor is successively eliminated.

Although my invention has been described in connection with a preferred embodiment, it will be appreciated that variations and modifications can be resorted to, as those skilled in the art will understand. For example, while I prefer to provide independent structures for my slide 7 and my plunger 4 for greater convenience in adding the same to my optical instrument after it is already set up, it will be apparent that the slide described herein may be constructed integral with the plunger, the projection or key being located at a point below the slot therein. Similarly, while I prefer to keep the entire plunger within the stadimeter housing to prevent its accidental depression while in the operative position, it is obvious that the top of the plunger can be made of sufficient length to pass through the port in the stadimeter housing, thus permitting the elimination of the special screw, whereby the upward movement of the plunger is restrained by the bottom of the periscope tube directly. These and other variations and modifications are considered to be within the scope of the present specification and within the purview of the appended claims.

I claim:

1. In a locking device for the control shaft of a combination periscope and stadimeter in which the controlling mechanism is detachable from the controlled mechanism, the combination which comprises a gear fixedly mounted on said shaft, a casing within said controlling mechanism having an opening through which said shaft may pass, a slide displaceably mounted in said casing and having a key thereon adapted to cooperate with said gear to lock said shaft against rotation, resilient means for urging said slide from an inoperative into an operative and shaft-locking position, and a bifurcated plunger having a slot through which the control shaft may pass interposed between and bearing with its ends on said slide and a surface on said controlled mechanism respectively, said plunger having such dimensions as to hold said slide against operative displacement in the normal assembled condition of controlling and controlled mechanisms and being capable of displacement together with said slide under the effect of said resilient means when said mechanisms are separated from each other thereby to cause positive and instantaneous locking of said shaft.

2. In a locking device for the control shaft of a combination periscope and stadimeter in which the controlling mechanism is detachable from the controlled mechanism, the combination which comprises a casing in said controlling mechanism fixedly mounted with respect to said shaft, a gear mounted on said shaft and rotatable therewith, a slide slideably mounted in said casing and having a key thereon adapted to engage one of the circumferential depressions of said gear and to lock said shaft against rotation, resilient means for urging said slide from an inoperative into an operative and shaft-locking position, and a bifurcated plunger slideable in said casing interposed between said slide and a surface on said controlled mechanism and having a slot between its forked ends through which the control shaft may extend, said plunger being adapted to hold said slide in its inoperative position in the assembled condition of controlling and controlled mechanisms and being capable of displacement together with said slide under the effect of said resilient means in the disassembled condition of such mechanisms thereby to cause locking of said shaft.

3. In a locking device for the control shaft of a combination periscope and stadimeter in which the controlling mechanism is detachable from the controlled mechanism, the combination which comprises a stop member rotatable with said shaft and presenting a plurality of circumferentially arranged locking surfaces, a displaceable bolt member adapted to engage one of said surfaces to lock said shaft against rotation, aligned ways for said bolt member, resilient means for displacing said bolt member in said ways from an inoperative into an operative and shaft-locking position, and a bifurcated control member displaceable in said ways having a slot between its forked ends through which the control shaft may extend, said control member being interposed between said bolt member and a surface of the controlled mechanism thereby to hold said bolt member against operative displacement until such time as said controlling and controlled mechanisms are separated from each other.

4. In a locking device for the control shaft of a combination periscope and stadimeter in which the controlling mechanism is detachable from the controlled mechanism, the combination which comprises a stop member rotatable with said shaft and presenting a plurality of circumferentially arranged locking sufaces, a displaceable bolt member adapted to engage one of said surfaces to lock said shaft against rotation, aligned ways for said bolt member, resilient means for displacing said bolt member in said ways from an inoperative into an operative and shaft-locking position, a bifurcated control member displaceable in said ways having a slot between its forked ends through which the control shaft may extend, said control member being interposed between said bolt member and a contact surface of the controlled mechanism thereby to hold said bolt member against operative displacement until such time as said controlling and controlled mechanisms are separated from each other, and means for adjusting said contact surface of the controlled mechanism.

FREDERICK L. G. KOLLMORGEN.